June 5, 1951  H. C. GRANT, JR  2,555,483
COUPLING
Filed May 29, 1944
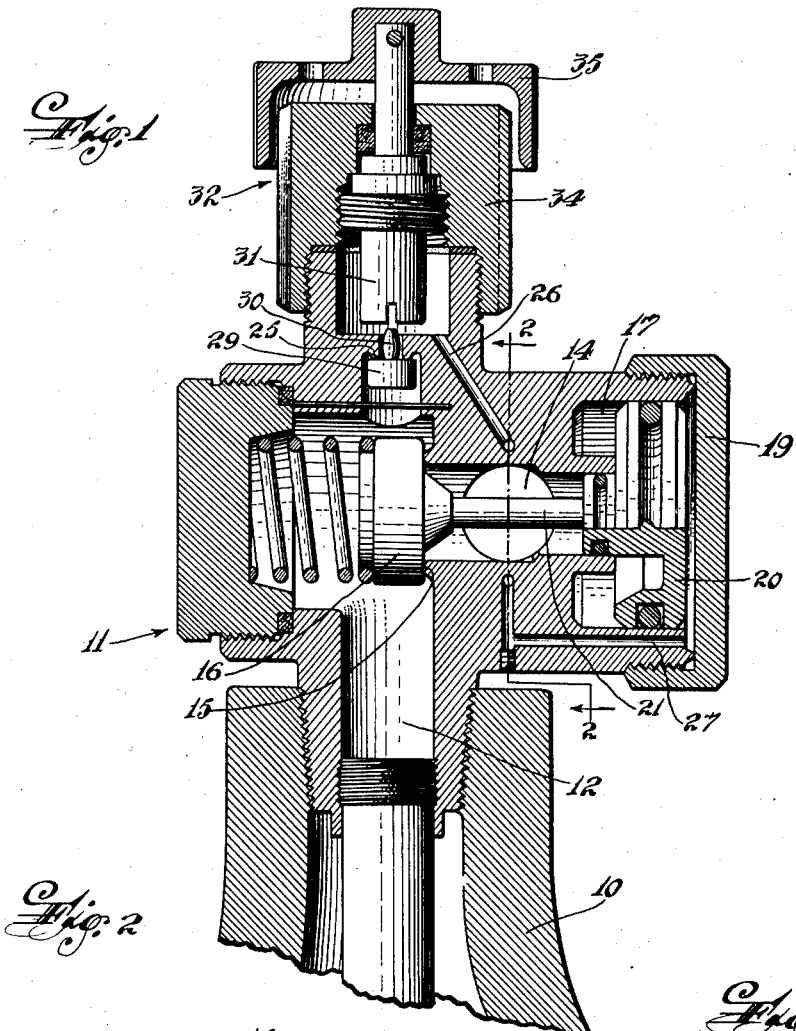
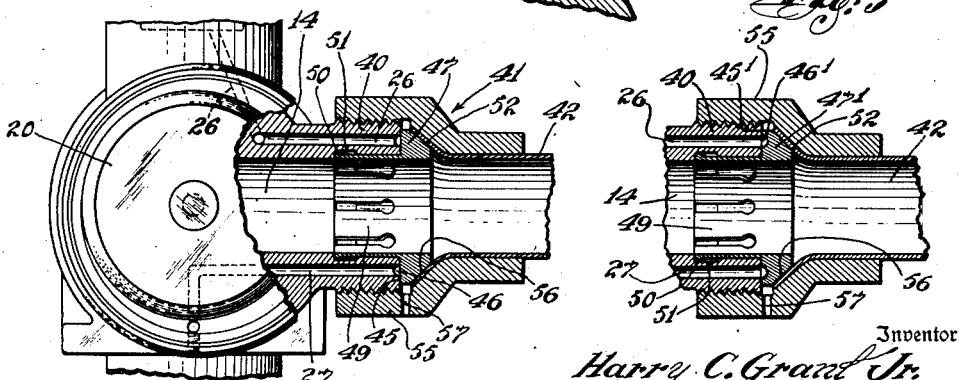
Inventor
Harry C. Grant Jr.
By
J. William Carsin
Attorney Patented June 5, 1951

2,555,483

UNITED STATES PATENT OFFICE 2,555,483

COUPLING

Harry C. Grant, Jr., New York, N. Y., assignor, by mesne assignments, to Specialties Development Corporation, Belleville, N. J., a corporation of New Jersey Application May 29, 1944, Serial No. 537,779

16 Claims. (Cl. 137—69)

The present invention relates to couplings for fluid pressure medium conduits, and more particularly to such couplings provided with a device for controlling the flow of fluid pressure medium through an auxiliary fluid conducting passage which is associated with the members of the coupling and is associated with means for effecting the discharge of fluid pressure medium through the conduit.

An object of the present invention is to provide a coupling of the foregoing described character, wherein the flow of pressure medium through the auxiliary passage is interruped when the members of the coupling are not connected in a predetermined manner.

Another object is to provide a coupling of the foregoing described character, wherein the flow of pressure medium through the auxiliary passage is made feasible only when the members of the coupling are properly connected.

Another object is to provide a coupling of the foregoing described character, wherein the release of fluid pressure medium through conduit members connected by the coupling is controlled by the connection of the members of the coupling.

Another object is to provide a coupling of the foregoing described character which is particularly adapted to be used in connection with fluid pressure actuated valves for releasing a high pressure fluid medium.

Another object is to provide coupling means for high pressure fluid medium release devices adapted to prevent recoil in the event the medium is released inadvertently.

A further object is to provide a device of the foregoing described character which is simple in construction, durable in use, efficient in operation, economical in manufacture, and which lends itself to mass production.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a sectional view of a control valve attached to a high pressure fluid medium container, embodying the present invention, Figure 2 is a sectional view taken substantially along the line 2—2 on Figure 1, illustrating in detail the coupling of the present invention.

Figure 3 is a fragmentary sectional view, illustrating modified detail of the coupling.

Referring more particularly to Figure 1 of the drawing, there is shown a container 10 adapted for storing a high pressure fluid medium, such as carbon dioxide, and having a discharge control valve 11 attached thereto.

The valve 11 comprises a body formed with an inlet opening 12, an outlet opening 14, and a valve seat 15 intermediate the inlet and outlet openings adapted to receive a spring seated valve member 16. The valve body is also formed with a piston chamber 17, closed at one end by a cap 19 secured to the valve body, for receiving a piston 20 operatively connected and adapted to unseat the valve member 16 by means of a piston rod 21.

The piston is adapted to be operated by the pressure medium in the container to effect unseating of the valve member 16 and discharge of the pressure medium by way of the outlet opening 14. To accomplish this, the valve body is provided with auxiliary fluid conducting means comprising a pilot valve seat 25 arranged to establish communication between the inlet opening 12 and a passage or duct 26 which is adapted to be operatively connected by means, about to be described, to a passage or duct 27 leading to in back of the piston 20.

The pilot valve seat 25 is adapted to receive a pressure seated pilot valve member 29 having a stem 30 adapted to be engaged by a shaft 31 of a control head 32 for effecting unseating of the pilot valve member to conduct pressure medium to in back of the piston 20. The control head, for purposes of illustration, comprises a body 34 attached to the valve body in which the shaft 31 is threaded for rotation, and a handwheel 35 mounted on the shaft 31 for effecting rotation thereof to unseat the pilot valve member 29.

From the foregoing it will be appreciated, that if the ducts 26 and 27 are operatively connected and the control head is operated accidentally or unintentionally, pressure medium from the container will be directed to the piston chamber 17 and the main valve member will be unseated to release the bulk of the pressure medium in the container by way of the outlet opening 14. In the event that the pressure medium is so released without the outlet being connected to a conduit for conveying the medium to its point of use, the rapid discharge of the medium into the atmosphere would effect undesirable recoil of the container.

As illustrated more particularly in Figure 2, the outlet opening extends through a neck or coupling portion 40 formed on the valve body, which is adapted to receive a coupling assembly 41, in accordance with the invention, for connecting a discharge conduit 42 and for simultaneously effecting operative connection of the ducts 26 and 27 when the conduit 42 is properly connected to the coupling portion 40.

To accomplish the foregoing, the ducts 26 and 27 each extend to the end face 45 of the coupling portion 40 and are connected by an annular groove 46 in the end face 45. In order to close the open side of the groove 46 to provide a pressure medium conducting passage, a ring or connector 47 is disposed on the end face 45.

The ring 47 is provided with a slotted sleeve portion 49 extending into the outlet opening and having a beaded portion 50 at the edge thereof which is slidably disposed in an annular recess 51 in the outlet opening 14. In this manner, prior to attaching the conduit 42, the ring is retained on the coupling portion 40 but is adapted to move away or be displaced from the end face 45 to preclude operative connection of the ducts 26 and 27.

The conduit 42 has a flared end 52 disposed in a coupling nut 55 adapted to be threadedly secured to the coupling portion 40. The flared end of the conduit is adapted to engage a frusto-conical sectioned end 56 of the ring to force the other end of the ring against the end face of the coupling portion 40 to thereby convert the groove 46 into a passage for establishing communication between the ducts 26 and 27.

In the event that the nut 55 is loosely coupled on the coupling portion 40 or is coupled without the conduit 42 being disposed therein, it is desirable to prevent discharge of the pressure medium by way of the outlet opening 14 upon operation of the pilot valve control head. To accomplish this, a vent 57 is provided in the coupling nut for relieving the pressure medium directed into the groove 46 by way of the duct 26 and being adapted to escape from the groove 46 by reason of the fact that the ring is not secured against the end face 45.

In Figure 3 a modified coupling assembly is illustrated which differs from the construction illustrated in Figure 2 in that the end face 45' is in the form of a flat annular surface and in that the ring or connector 47' is provided with an annular groove 46' adapted to establish communication between the ducts 26 and 27 when the ring is forced against the end face.

From the foregoing description it will be seen that the present invention provides an improved coupling assembly which prevents unintentional or accidental discharge of fluid pressure medium unless the elements of the coupling assembly are properly arranged and secured together. The coupling assembly further eliminates the problem of the recoiling of high pressure medium containers when they are discharged while disconnected from a delivery conduit. The coupling assembly is simple and rugged in construction and can withstand any rough usage to which it may be subjected.

While the present invention has been described in connection with a valve, by way of example, it will be appreciated that the coupling assemblies in accordance with the invention may be utilized for many analogous purposes.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a device of the character described, a pair of coupling members each having a central bore adapted to be connected together for permitting the passage of fluid through their central bores, one of said coupling members having an auxiliary fluid conducting passage formed in its wall and being independent of its central bore, and fluid operated means dependent on the connection of said coupling members for controlling the flow of fluid through said auxiliary passage.

2. In a device of the character described, a pair of coupling members adapted to be connected together and having a main bore for the passage of fluid therethrough, one of said coupling members having a pair of spaced passages, and means movably mounted on one of said coupling members and adapted to be positioned for effecting communication between said passages whereby fluid from one passage is adapted to be conveyed to the other passage.

3. In a device of the character described, a pair of coupling members having communicating bores for the passage of fluid therethrough, one of said members being formed with a pair of spaced fluid conducting passages, means disposed between said members for effecting communication between said passages whereby fluid from one passage is conveyed to the other passage, said means being secured in position for effecting communication between said passages when said members are in normal coupled condition, said means being rendered ineffective for maintaining communication between said passages when said members are disposed in other than normal coupled condition.

4. In a device of the character described, a pair of coupling members having communicating bores for the passage of fluid therethrough, one of said members being formed with a pair of spaced fluid conducting passages, fluid operated means disposed between said members for effecting communication between said passages whereby fluid from one passage is conveyed to the other passage, said means being secured in position by said members for effecting communication between said passages when said members are in normal coupled condition, said means being rendered ineffective by fluid from one of said passages for maintaining communication between said passages when said members are disposed in other than normal coupled condition.

5. In a device of the character described, a pair of coupling members provided with communicating bores for the passage of fluid therethrough and with one of said members having an end face and formed with spaced passages communicable with each other about said face, means disposed on said face for effecting communication between said passages and being normally maintained on said face by said members when the latter are in normal coupled condition, said means being displaceable from said face by fluid from one of said passages when said members are in other than said normal coupled condition to render said means ineffective.

6. In a device of the character described, a pair of coupling members provided with communicating bores for the passage of fluid therethrough and with one of said members having an annular face and formed with spaced passages communicable with each other about said face, a distributor member disposed on said face and between said members for effecting communication between said passages whereby fluid from one passage is conveyed to the other passage, said member being normally clamped to said face by said members when the latter are in normal coupled condition and displaceable from said face by fluid from one of said passages when said members are in other than said normal coupled condition to render said member ineffective.

7. In a device of the character described, a coupling portion and a coupling nut each provided with communicating bores for the passage of fluid therethrough and with said coupling portion being formed with an annular end thereon having an annular groove face and being formed with a pair of spaced passages extending into said groove, a ring disposed on said face and closing said groove for effecting communication between said passages whereby fluid from one passage is conveyed to the other passage, said ring being normally clamped to said face and maintained thereon when said coupling nut is in normal coupled condition on said coupling portion, said ring being displaceable from said face by fluid from one of said passages when said coupling nut is in other than said normal coupled condition.

8. In a device of the character described, a coupling portion and a coupling nut each provided with communicating bores for the passage of fluid therethrough and with said coupling portion being formed with an end face and with a pair of spaced passages terminated at said end face, a ring disposed on said face of said coupling portion and formed with an annular groove effecting communication between said passages whereby fluid from one passage is conveyed to the other passage, said ring being normally clamped to said face and maintained thereon when said coupling nut is in normal coupled condition on said coupling portion, said ring being displaceable from said face by fluid from one of said passages when said coupling nut is in other than said normal coupled condition.

9. A valve comprising a body having an inlet and an outlet passage and a valve seat intermediate said inlet and outlet passages, a valve member for said seat, pressure operated means for unseating said valve member, coupling means associated with said outlet passage, said valve body having a duct extending from said inlet passage to said coupling means, pilot valve means in said duct, said valve body having a second duct extending from said coupling means to said pressure operated means, a conduit coupling member adapted to be connected to said coupling means, and means dependent on the connection of said conduit coupling member to said coupling means for establishing communication between said ducts.

10. A valve comprising a body having an inlet and an outlet passage and a valve seat intermediate said inlet and outlet passages, a valve member for said seat, pressure operated means for unseating said valve member, coupling means associated with said outlet passage, said valve body having a duct extending from said inlet passage to said coupling means, pilot valve means in said duct, said valve body having a second duct extending from said coupling means to said pressure operated means, a conduit coupling member adapted to be connected to said coupling means, means movably mounted on said coupling means and dependent on the connection of said conduit coupling member to said coupling means for establishing communication between said ducts, and means for operating said pilot valve means.

11. A valve body containing an inflow and an outflow passageway, a removable connection attachable to said outflow passageway, a main valve openable for connecting said inflow to said outflow passageway, a fluid expansible means for opening said main valve, means actuable at the will of the operator for directing fluid under pressure from said inflow passageway to said fluid expansible means for expanding said fluid expansible means for opening said main valve, and means operable by loosening of said removable connection for relieving the pressure in said fluid expansible means, whereby said main valve is closed when said connection is loosened.

12. The combination, in a valve, of a valve body having an inflow and an outflow passageway, a removable connection attachable to said outflow passageway, a main valve openable for connecting said inflow to said outflow passageway, a fluid expansible means for opening said main valve, means actuable at the will of the operator for directing fluid under pressure from said inflow passageway to said fluid expansible means for expanding said fluid expansible means for opening said main valve, and a pressure bleeding passageway connecting said fluid expansible means to a place adjacent said removable connection, operative to be opened by loosening said removable connection to relieve said fluid expansible means of said fluid under pressure to close said main valve.

13. The combination, in a valve, of a valve body having an inflow passageway and a hub containing an outflow passageway, a main valve openable for connecting the inflow to the outflow passageway, a fluid expansible means for opening said main valve, a passageway for conveying fluid under pressure from the inflow passageway axially through the wall of said hub to the outer end thereof, a circumferentially spaced apart fluid conveying passageway for conveying fluid under pressure from said outer end axially through the wall of said hub to said fluid expansible means, a removable connection attachable to said hub adapted for extending said outflow passageway and for connecting the ends of said fluid conveying passageways when said connection is fully attached, means operable at the will of the operator for admitting fluid under pressure from said inflow passageway through the first said fluid conveying passageway, and, when said connection is fully attached, through the second said fluid conveying passageway to said fluid expansible means for expanding said fluid expansible means for opening said main valve.

14. The combination, in a valve, of a valve body having an inflow passageway and a hub, said hub containing an outflow passageway and an annular groove in the end, one side of the groove being open, a removable connection attachable to said hub to extend said outflow passageway and to tightly close the open side of said groove, but only when said connection is fully attached, a main valve openable for connecting the inflow to the outflow passageway, a fluid expansible means for opening said main valve, a passageway for conveying fluid under pressure from the inflow passageway axially through the wall of said hub to said annular groove, a circumferentially spaced apart passageway for conveying fluid under pressure from said annular groove axially through the wall of said hub to said fluid expansible means, means operable at the will of the operator for admitting fluid under pressure from said inflow passageway through the first said fluid conveying passageway to said annular groove, and, when said annular groove is closed, from said annular groove through the second said fluid conveying passageway to said fluid expansible means for expanding said fluid expansible means for opening said main valve.

15. In a device of the character described, a pair of coupling members adapted to be connected together, a movable element slidable axially of said members, one of said members having a plurality of ports therein, and means carried by the other of said members adapted to engage said element during the movement of the coupling members into coupling position and to move the element into position relative to said ports to control the flow of fluid through the ports when the members are in normal coupled condition.

16. In a valve assembly, the combination of a housing having a coupling portion, a coupling member adapted to be connected to said coupling portion, a valve for controlling the passage of fluid through said coupling portion and the coupling member, fluid actuated means for opening said valve, said coupling portion having an auxiliary fluid conducting means therein in communication with the fluid actuated means, and means dependent on the connection of said coupling member to said coupling portion for controlling the flow of fluid through said auxiliary means whereby to control the operation of the fluid actuated means for effecting the operation of the valve.

HARRY C. GRANT, JR.

REFERENCES CITED

The following references are of record in the file of this patent:

UNITED STATES PATENTS

| Number | Name | Date |
| --- | --- | --- |
| 543,480 | Hendrickson | July 30, 1895 |
| 687,895 | Millea | Dec. 3, 1901 |
| 707,983 | Trethewey | Aug. 26, 1902 |
| 1,097,263 | Reich | May 19, 1914 |
| 1,112,144 | Kent | Sept. 29, 1914 |
| 1,521,482 | Steele | Dec. 30, 1924 |
| 1,862,920 | Boynton | June 14, 1932 |
| 1,927,430 | Williams | Sept. 19, 1933 |
| 2,005,845 | Pardee | June 25, 1935 |
| 2,147,084 | Bouchard | Feb. 14, 1939 |
| 2,236,104 | McIntosh | Mar. 25, 1941 |
| 2,291,619 | Grant, Jr. | Aug. 4, 1942 |
| 2,335,923 | Dube | Dec. 7, 1943 |
| 2,352,434 | Hoagland | June 27, 1944 |
| 2,418,817 | Cantlin | Apr. 15, 1947 |

FOREIGN PATENTS

| Number | Country | Date |
| --- | --- | --- |
| 562,349 | Germany | Mar. 13, 1929 |
| 702,665 | Germany | Feb. 13, 1941 |